United States Patent [19]

Stechmeyer

[11] 4,104,171

[45] Aug. 1, 1978

[54] METHOD FOR TRANSPORTING WAXY OILS BY PIPELINE

[75] Inventor: Frank W. Stechmeyer, Newport Beach, Calif.

[73] Assignee: Union Oil Company of California, Brea, Calif.

[21] Appl. No.: 755,840

[22] Filed: Dec. 30, 1976

[51] Int. Cl.[2] .................... C09K 3/00

[52] U.S. Cl. .................... 252/8.3; 252/8.55 R; 137/1; 137/13; 302/66

[58] Field of Search .................... 252/8.3, 8.55 R; 137/1, 137/13; 302/66

[56] References Cited

U.S. PATENT DOCUMENTS

| | | | |
|---|---|---|---|
| B 499,370 | 3/1976 | Merrill | 137/13 X |
| B 516,625 | 3/1976 | Gudelis et al. | 208/33 |
| 3,669,189 | 6/1972 | Fischer | 252/8.3 X |
| 3,675,671 | 7/1972 | Sweeney et al. | 137/13 |
| 3,684,685 | 8/1972 | Herbstman | 208/37 |
| 3,735,770 | 5/1973 | Day et al. | 252/8.3 |
| 3,776,247 | 12/1973 | Choufoer et al. | 173/13 |
| 3,776,248 | 12/1973 | Titus | 252/8.3 |
| 3,791,395 | 2/1974 | Dunlap et al. | 137/13 |
| 3,880,177 | 4/1975 | Kersch | 137/13 |

OTHER PUBLICATIONS

Ellis et al., "The Design of Pipelines to Handle Waxy Crude Oils," Journal of Institute of Petroleum, vol. 57, No. 555, May 1971, pp. 175–183.

Price, "Flow Improvers for Waxy Crudes," Journal of the Institute of Petroleum, vol. 57, No. 554, Mar. 1971, pp. 106–109.

*Primary Examiner*—Benjamin R. Padgett

*Assistant Examiner*—J. L. Barr

*Attorney, Agent, or Firm*—Richard C. Hartman; Dean Sandford

[57] ABSTRACT

A process for reducing the force required to restart the flow of wax-containing oil which has statically cooled to its pour point or below by inserting a plurality of yieldable fluid spacers in an oil column to divide the column into shorter hydraulically isolated segments and thus reduce the forces required to yield the gelled oil.

11 Claims, 3 Drawing Figures

METHOD FOR TRANSPORTING WAXY OILS BY PIPELINE

BACKGROUND OF THE INVENTION

The invention relates to the pipeline transportation of wax-containing oil and more particularly to a method for reducing the pipeline pressure necessary to facilitate starting and restarting the pipeline flow.

Certain oils, such as crude petroleum and shale oil, contain a sufficient concentration of wax so that below a certain temperature, referred to as the pour point temperature, the wax content of the oil causes it to become viscous and the oil may even gel if permitted to stand for sufficient period of time below its pour point. The pour point temperature of an oil may vary widely depending upon the nature of the oil, its wax content and composition, and other factors. Thus, the pour point will vary widely depending upon the oil and can range from temperatures as high as 90° F to as low as 0° F. At temperatures above the pour point, the oil can be transported by pipeline efficiently and economically. At temperatures below the pour point, however, the wax content of the oil can begin to congeal and raise the viscosity of the oil causing a high pressure loss through the line and requiring excessive pump output pressures to move the oil.

A related problem with high pour point oils is caused by the fact that when the oil is allowed to come to rest, such as would occur during a pipeline shutdown at temperatures near or below the pour point of the oil, the oil will have a tendency to form a gel-like material having a high yield strength. Depending upon the length of the column of oil to be moved, the size and number of pumps, the diameter of the pipeline, the temperature and the yield strength of the oil at that temperature, the energy requirements to restart the oil flow may exceed the maximum allowable operating pressure of the pipe line resulting in a line shutdown until the pour point temperature is exceeded or the gel otherwise broken.

Depending upon the geographical location of the pipeline, the season of the year, whether the pipeline is buried or laid upon the bottom of a body of water or exposed to the atmosphere, the temperature of the oil in the pipeline can fall below its pour point and begin to thicken or gel in the line, particularly if flow should be interrupted for any reason. Consequently, pour point additives have been developed for mixture with an oil in order to lower its pour point and thus render more economical the pumping of the oil even at temperatures below its pour point. In addition these additives are designed to permit restarting of the line in the event of a shutdown where the temperature is at or below the pour point of the oil being pumped. The prior art is replete with various additives designed to inhibit the viscosity increase of the oil and to effectively reduce its pour point. These additives, however, must be added in sufficiently high concentration to inhibit not only the viscosity increase of the flowing oil when temperatures below its pour point are encountered but also in sufficiently high concentrations to inhibit the formation of the high yield strength gel in the event of a pipeline shutdown at temperatures below the pour point of the oil.

These additives increase the expense of pipeline transport of oil, particularly during the winter months in northern climates. Consequently a need exists for a more economical method for the transportation of high pour point temperature oils in which the restarting of oil flow in the event of a pipeline shutdown can be accomplished even at temperatures at or below the pour point temperatures of the oil being pumped.

SUMMARY OF THE INVENTION

The present invention resides in a method for transporting oil in pipelines where the oil may be exposed to temperatures below its pour point. In accordance with the invention fluid spacers are disposed in the column of oil at intervals along the column to divide the column into shorter segments and thus reduce for force necessary to restart the flow of oil in the event of a pipeline shutdown. The length and number of segments are selected so that the restart pressure is below the maximum operating pressure for the pipeline. The fluid spacers are comprised of a material which is fluid at the temperature of the stagnant oil column and has a low yield strength at that temperature.

DESCRIPTION OF THE INVENTION

When oil containing dissolved wax is allowed to cool below the solidification point of the wax, solid wax precipitates are formed which increase the viscosity of the oil resulting in a greater energy requirement necessary to pump the oil. In addition, when the oil is permitted to come to rest at temperatures at or below the solidification point of the wax, the wax precipitates can form a gel which causes the oil to be converted from a simple fluid to a non-Newtonian fluid which may require more energy to reinitiate flow than is available from the pumping system. The point at which the oil begins to change from a simple fluid to a non-Newtonian fluid is known as the "pour point" while the energy required to initiate flow of the oil when in the gel condition is referred to as the "yield strength". The lower the temperature the more rapidly is the oil gelled and, similarly, the lower the temperature the greater the yield strength of a given oil.

The term "pour point" as employed herein means the lowest temperature at which the oil is observed to flow under conditions prescribed by ASTM test method D97-66 entitled "Standard Method of Test for Pour Point", ASTM Standards, American Society for Testing Materials, Part 17, November, 1971, pages 58-61, which procedure is herein incorporated by reference.

The term "yield strength" is used interchangeably with the term "yield stress" and, as employing herein, either of the terms mean the shearing stress at the yield point i.e., the point that a gel will begin to flow under applied pressure. Yield strength is dependent not only on the wax content and chemical makeup of the oil but also upon the thermal history, such as the rate of cooling, the temperature range through which it has been cooled and the like, the rheological history, for example the amount of shearing to which the oil has been subjected and the like.

Figure 1:
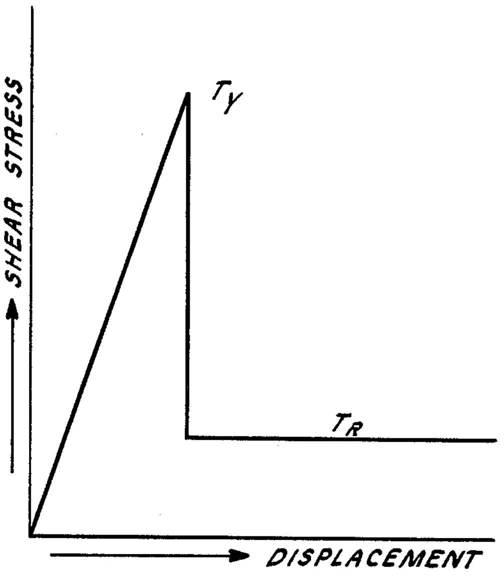
FIG. 1 is a simplified model of the mechanical properties of a wax-containing oil which has pooled at a temperature below its pour point.

Referring to FIG. 1 there is shown a simplified model which illustrates the mechanical properties of a gelled oil as related to yielding. The vertical axis of the drawing represents shear stress while the horizontal axis represents fluid displacement. It can be seen that as a force is applied to the gelled oil there is some displacement as a result of elastic deformation. The displacement continues until reaching a shear stress value equal to the yield strength ($\tau_y$) of the gel. At this point the gel structure yields and there is a substantial drop in shear stress accompanied by an increase in displacement. Having once been yielded, if flow is stopped and then restarted, the stress or force required to restart the displacement remains a substantially constant level below the $\tau_y$ for the oil. This level is referred to as the remanent yield value ($\tau_R$). As reported by Vershuur et al in a paper entitled "The Effect of Thermal Shrinkage and Compressibility on the Yielding of Gelled Waxy Crude Oils and Pipelines", J. Inst. Pet. V. 57, No. 555, May, 1971, pages 131–137, the simplified model of FIG. 1 represents the behavior of a variety of waxy oils although the peak of the curve as represented by the yield strength, $\tau_y$, the slope of the curve after yielding and the level of the remanent yield stress, $\tau_R$, of the oil will vary widely for differing oils. The profile of mechanical properties for the particular oil being pumped, however, is readily determined by laboratory tests or by tests in the actual pipeline under the environmental conditions to which it is anticipated the oil in the pipeline will be subjected to. In this connection, it is conventional practice to predict the minimum temperature to which the oil can be reasonably expected to be exposed. Typically this information is used to estimate the amount of pour point reducing additive required to insure pumpability of the oil. In this case, however, the minimum temperature is used in the determination of the $\tau_y$ for the oil being pumped using the method set out in the Vershuur et al article referred to above.

The relationship between the yield strength ($\tau_y$) of a gelled oil and the pressure ($\Delta P$) require *d* to restart a line containing the gelled oil is represented by the formula:

$$\Delta P = \frac{4L}{D} \cdot \tau_y \qquad (1)$$

where $\Delta P$ = pump pressure;

L = length of the line to be yielded;

$\tau_y$ = yield strength of the oil; and

D = internal diameter of the pipe.

Thus, when $\Delta P$ exceeds the maximum operating pressure limitations (P max) of the line, initiation of flow of the oil in the line cannot be accomplished. P max is dependent upon a number of factors well-known in the art, including, for example, pump output, the number of pumps, pressure limitation of the pipe line itself or a combination of these factors.

In accordance with the present invention, the $\Delta P$ of the oil in the pipeline is maintained at or below the maximum pressure (P max) for the system by dividing the oil in the pipeline into segments which are separated from adjacent segments by readily yieldable fluid spacer elements. In this manner the length of each segment is such that the $\Delta P$ required to overcome the $\tau_y$ of the segments in order to initiate movement or flow of the segments is not greater than P max.

The minimum number of segments into which the oil is divided in accordance with the present invention is related to the maximum operating pressure, P max, of the oil line system and can be represented by the expression:

$$K > \frac{4L(\tau_y - \tau_R)}{DP_{max} - 4L\,\tau_R} \qquad (2)$$

where:

K is the number of segments;

$\tau_y$ is the yield strength of the oil;

$\tau_R$ is the remanent yield stress of the oil; and

P max is the maximum operating pressure of the pipeline system.

The process of the invention is practiced by disposing yieldable fluid spacers in the oil column to define in the column a plurality of smaller segments each of which will require a lower pump pressure to yield than the undivided column. The manner in which the fluid spacers are disposed in the oil column is not critical and the spacers can be introduced to a flowing stream of oil or to a static column.

For example, in a line provided with a plurality of injection ports, the spacers can be introduced after the flow of oil has stopped. This is primarily useful for scheduled shutdowns of short pipeline runs.

Under typical operating conditions, the fluid spacer is preferably introduced into the line at a convenient point while oil is flowing therein. The spacer is then carried along with the oil through the pipeline to the terminus. This is most conveniently accomplished by introducing the fluid spacer composition in a series of timed increments to the flowing oil stream. The time between increments is determined by the flow rate in the pipeline and by the length and number of segments desired in the line as determined by the relationships discussed above. Having once been introduced into the pipeline, should the flow of oil be interrupted for a sufficient period of time to permit the oil to statically cool to a temperature of about its pour point or less, the spacer element serves as a yieldable barrier between segments to permit flow to be reestablished at a lower pressure than would be required to initiate flow for an unsegmented oil column.

Figure 2:
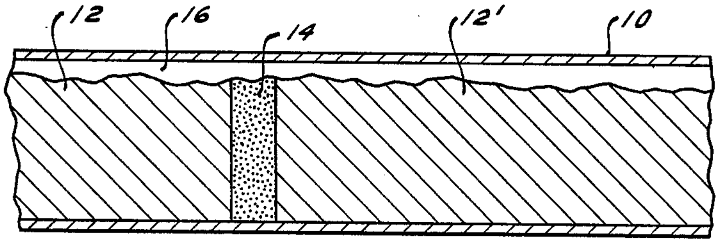
FIG. 2 is a schematic sectional view of a pipeline illustrating a stagnant column of oil segmented in accordance with the invention, which has been held below its pour point for sufficient time to result in a gel formation in the oil.
Figure 3:
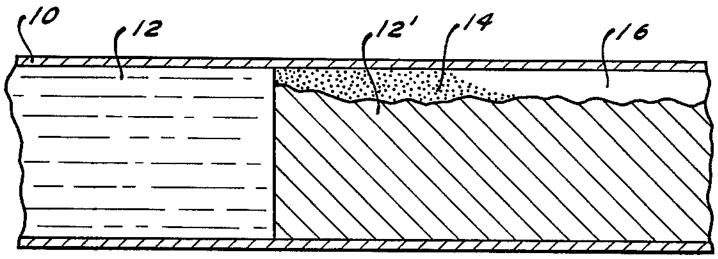
FIG. 3 is the sectional view shown in FIG. 2 with one segment of the oil column being yielded.

As is more clearly shown in FIGS. 2 and 3, the pipeline 10 contains an oil column which has been divided into segments 12 and 12' by a fluid spacer 14. The column of oil has been permitted to statically cool to a temperature below its pour point which results in a contraction of the column of oil away from a portion of the walls of the pipeline 10 to form a space 16 between the oil and the pipe.

A force is imposed on the segment 12 of sufficient strength to exceed its $\tau_y$ which results in a breakdown of the gel structure and initiation of flow of the segment 12. Initiation of the flow displaces the fluid spacer 14 from its normal position between the segments 12 and 12' into the space 16 between the segment 12' and the wall of the pipeline 10. This allows for the displacement of the segment 12 into contact with the segment 12'. Upon contact between the segment 12 and the still gelled segment 12', the force is transmitted to the segment 12' and the process is repeated.

As can be seen from the relationships 1 and 2 above, dividing of the oil column into smaller segments results in a reduction in the total force required to restart flow. The thickness of the spacing element 14 and the resultant spacing between individual segments of wax-containing oil is a matter of choice depending upon the profile model of the oil being transported. For example, if the slope between $\tau_y$ and $\tau_R$ is steep, as shown in FIG. 1, the amount of displacement required to lower the yield value to the remanent yield strength for the oil can be at a minimum. On the other hand, should the slope be shallow, then the fluid spacer 14 will necessarily be thicker in order to provide sufficient displacement room for the segment of oil being yielded.

The spacing material used to separate the oil segments is selected from a material which is capable of yielding at pressures below P max, even at temperatures at or below which the oil will gel if permitted to stand. Thus, the yieldable spacer material is a fluid, liquid or gaseous, which, through displacement or compression, will permit displacement of the preceding segment of oil.

Since the carrying capacity of the pipeline is of particular concern to the pipeline operator, it is highly preferred that the spacer material comprise an oil which can be refined and utilized at the terminus of the pipeline. It will be recognized that pipelines extend over long distances and that the combined volume of spacer material can represent a substantial portion of the capacity of the pipeline. Accordingly, it is preferred that the spacer material comprise a product which is useable at the terminus of the pipeline. For these reasons it is highly preferred that the spacer material comprise oil which has been dewaxed or otherwise has a low pour point. Thus, a small facility for dewaxing the oil can be set up at the head of the pipeline to dewax oil and thus provide a low pour point oil for use as the fluid spacer. The spacer material is then utilized along with the high wax oil at the terminus of the pipeline and there is substantially no loss in carrying capacity of the pipeline due to the use of fluid spacers to divide the high wax oil segments.

In cases where dewaxing facilities are not available, a pour point reducing material can be admixed with the wax-containing oil to provide an oil mixture which has a low pour point and can thus be utilized as the spacer material. Any of the conventionally used pour point reducing agents may be utilized in sufficiently high proportions to insure that the oil/point reducing agent mixture is yieldable at the temperatures and cooling rates to which the oil can be expected to be exposed. For example, various copolymers of ethylene and ethylenically unsaturated esters are effective in reducing the pour point and yield stress of high pour point wax-containing oils. Examples of these copolymers are the copolymer ethylene/vinyl formate, copolymer ethylene-/allyl formate, copolymer ethylene/vinyl acetate, copolymer ethylene/ethyl methacrylate, copolymer ethylene/methyl methacrylate, copolymer ethylene/-stearyl methacrylate, and the like. In addition monohydroxy phenols having molecular weights below about 300 may be incorporated along with the aforementioned copolymers with good results. The proportion of pour point reducing additive utilized with the oil will depend upon the wax content of the oil, its pour point and other similar factors well-known to those skilled in the art of reducing oil pour point by the use of pour point reducing agents. Although the additive may be employed in proportions on the order of 10,000 ppm or more, it is preferred to employ the additive at concentrations between about 5 and about 200 ppm.

In addition to the foregoing, other methods are also known in the art for reducing the pour point of wax-containing oils. For example, the oil can be supersaturated with a gas which acts to prevent the agglomeration of the wax into a continuous gel structure. This gas-saturated oil can be utilized as a spacer material. Similarly, light hydrocarbon solvents of the class consisting of butane, propane, and mixtures thereof, can be added in sufficient quantity to dissolve the wax in the oil but in insufficient amounts to establish a vapor pressure as great as the pressures prevailing in the pipeline conduit at the operating temperatures so that the light hydrocarbon solvent remains a liquid. Under normal circumstances, pressures in the pipeline will remain relatively stable even in the event of a pipeline stoppage, assuming of course that there is no line rupture or similar reason for pressure loss.

In the preferred practice of the present invention, the oil segments are formed by adding the fluid spacer material to the flowing oil in timed increments, preferably at the line head. The spacer material then flows with the oil through the line to effect separation between the segments of oil. In flowing through the line, a certain amount of interface mixing will occur between the spacer material and the oil. It is preferred to maintain such interface mixing at a minimum and in accordance with pipeline design considerations, mechanical features such as streamlined headers, elimination of pockets, or deadends, and the like, are known to have a substantial effect on reduction of interface mixing of different fluids in a conduit. In addition, the more turbulent the flow, the less will be the interface mixing. Consequently it is preferred from the standpoint of maintaining interface mixing at a minimum that the oil flowing through the pipeline have a high Reynolds number. It should be clear, however, that interface mixing cannot be completely avoided and some mixing does occur, particularly over long runs. Consequently, due to factors understood in the art, the axial length of a spacer element will typically increase in direct relationship to the length of the run and the rate of increase is dependent upon the Reynolds number of the flow of oil through the line. Another important consideration with interface mixing is that the concentration of the material in the spacer element will gradually decrease due to interface mixing with the surrounding wax-containing oil as the spacer element travels through the pipeline and the yield strength of the spacer element can gradually increase. Consequently the concentration of material forming the spacer element must be sufficiently high in the increments introduced into the pipeline so that the downstream spacer elements will continue to have the desired low yield strength and yieldability necessary to the proper functioning of the method of the present invention even though some mixing of the fluid spacer material and the wax-containing oil has occurred.

EXAMPLE

The following is illustrative of the application of the method of the present invention in the transportation of crude shale oil. The crude shale oil is transported through a line having a 6 inch diameter (nominal) and a length of 70,000 feet. The line is designed to transport on the order of 8,000 barrels per day of crude shale oil and the pumps are designed to provide a maximum working pressure (P max) of 2,000 psi (or 288,000 lb/ft²). The minimum operating temperature of the line is predicted to be 35° F.

The shale oil has a typical gravity of 34.9° API at 60° F and a pour point of 80° F. At or below the pour point temperature, the yield value of the gelled shale oil ($\tau_y$), is about 0.7 lb/ft² while the remanent yield value after flow ($\tau_R$) is about 0.4 lb/ft². Assuming the shale oil is at or below its pour point temperature after interruption of flow, the pressure drop required to reinitiate flow is calculated by the relationship $$P = \frac{4L}{D} \cdot \tau_y$$

$$\Delta P = \frac{(4)\ (70{,}000)}{(0.5)}\ (0.7)$$

where

ΔP is the pressure drop (lb/ft²) over the length (L) of pipeline;

$\tau_y$ is the yield value, lb/ft²; and

D is the pipe diameter, feet.

Thus, in the pipeline operation described above where the entire length of the 6 inch diameter line is filled with static oil cooled to a temperature below its pour point and having a yield value of 0.7 lb/ft², the pressure drop required to initiate flow is $$\Delta P = \frac{(4)\ (70{,}000)}{(0.5)}\ (0.7)$$

$$\Delta P = 392{,}000 \text{ lb/ft}^2\ (2{,}722 \text{ lb/in}^2)$$

It becomes apparent that the ΔP to initiate flow through the line is in excess of P max and consequently should flow be interrupted and the oil allowed to statically cool to or below its pour point temperature, it will be impossible to reinitiate flow through the line until such time as the temperature of the shale oil is raised to a point where the $\tau_y$ is significantly reduced.

Utilizing the method of the present invention, the column of oil flowing through the line is divided into a multiplicity of smaller segments which individually, because of their shorter lengths, require lower pressures to initiate flow of each stagnate oil segment. The minimum number of segments required to reinitiate flow is calculated according to formula number (2)

$$K > \frac{4L(\tau_y - \tau_R)}{DP_{max} - 4L\ \tau_R}$$

set forth above and given the line parameters set out above the minimum number of segments is $$K > \frac{(4)\ (70{,}000)\ (0.7 - 0.4)}{(0.5)\ (288{,}000) - (70{,}000)\ (0.4)}$$

$$K > 2.63$$

Thus the number of segments should be 3 or greater.

It is preferred practice to actually divide the pipeline into more than the minimum number of segments so as to insure that the yield stress required to reinitiate flow in the line is less than P max and it is highly preferred to divide the line into twice the minimum number of segments. The length of the segments is approximated by dividing the number of segments into the length of the line. Accordingly, using 6 segments, the length of each segment is 11,666 feet and the total pressure drop required to restart flow is calculated to be 261,360 lb/ft² (1814 lb/in²) which is calculated by substituting K = 6 in Equation 2 and solving for P.

The spacing between each of the segments if accomplished by adding an oil flow improver such as Exxon Chemical Company's ECA 4821X, a fumarate vinyl acetate copolymer. The additive-containing segments will be short compared to the overall length of the pipeline and due to the presence of the additive will have a very low yield value at temperatures to 35° F. Based on a flow rate of 8,000 barrels/day or 233 gal/min it is calculated that it will take one segment of shale oil 73 minutes to pass a given point in the line. Accordingly every 73 minutes approximately a gallon increment of the additive composition is injected into the line at the point where the shale oil leaves the storage tank and enters the line. The low yield value mixture serves as the spacer element dividing individual segments of shale oil. Due to interface mixing it is estimated that at the terminus of the line the spacer element will have grown to a length of approximately 650 feet, or in other words the additive will have been diluted into approximately 955 gallons of shale oil. The amount of additive composition introduced at the head of the line is selected so that at the terminus of the line the concentration of additive in the oil is about 1,000 ppm, which is an effective concentration of the additive in the oil at 35° F.

Although various embodiments of this invention have been described, it will be clear that further modifications will be apparent to those skilled in the art. Such modifications are included within the scope of this invention as defined by the following claims.

I claim:

1. In the transportation of a wax-containing oil by pipeline, a method for reducing the force required to initiate the flow of a gelled static column of the oil in the pipeline, the method comprising:

forming a plurality of segments in the column of oil, the number and length of said segments being selected so that the pressure required to initiate flow of the oil at any point in the pipeline is less than the maximum operating pressure allowable at that point; and separating each segment from adjacent segments by a fluid spacer comprising a material which is fluid at the temperature of the static column of oil and which has a low yield strength relative to said oil at that temperature.

2. The method of claim 1 wherein the number of segments is selected to be greater than the relationship:

$$K > \frac{4L(\tau_y - \tau_R)}{DP_{max} - 4L\ \tau_R}$$

where;

L is the length of the column of oil, $\tau_y$ is the yield stress of the oil, $\tau_R$ is the remanent yield stress of the oil after flow, D is the diameter of the pipeline, and P max is the maximum operating pressure of the pipeline.

3. The method of claim 2 wherein the number of segments is selected to be at least twice the value of K.

4. The method of claim 1 wherein said fluid spacer comprised a mixture of said wax-containing oil and an effective amount of a pour point reducing agent to reduce the pour point of the mixture so that the mixture has a low yield value at the temperature of the stagnant column of oil.

5. The method of claim 1 wherein said fluid spacer comprises dewaxed oil.

6. The method of claim 1 wherein said fluid spacer is introduced in timed increments into a flowing stream of said wax-containing oil in said pipeline.

7. The method of claim 1 wherein said material remains fluid at temperatures as low as predicted minimum operating temperatures throughout the entire run of said pipeline.

8. The method of claim 6 further including the step of dewaxing a portion of said wax-containing oil and using said dewaxed oil to form said fluid spacer.

9. The method of claim 1 wherein said wax-containing oil is crude petroleum.

10. The method of claim 1 wherein said wax-containing oil is crude shale oil.

11. The method of claim 1 wherein said fluid spacer is introduced into said static column of oil through a plurality of injection ports in said pipeline.

* * * * *